(12) United States Patent
He et al.

(10) Patent No.: US 8,902,176 B2
(45) Date of Patent: Dec. 2, 2014

(54) HAPTIC FEEDBACK APPARATUS

(75) Inventors: Jie He, Shenzhen (CN); Zheng-Ping Qing, Shenzhen (CN); Lin Liu, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 997 days.

(21) Appl. No.: 12/855,486

(22) Filed: Aug. 12, 2010

(65) Prior Publication Data

US 2011/0109571 A1    May 12, 2011

(30) Foreign Application Priority Data

Nov. 9, 2009  (CN) .................. 2009 2 0260193 U

(51) Int. Cl.
*G06F 3/041* (2006.01)
(52) U.S. Cl.
CPC ................. *G06F 3/0414* (2013.01)
USPC ........................................ 345/173
(58) Field of Classification Search
CPC ............................. G06F 3/0414; G06F 3/016
USPC ................... 345/173; 340/407.2; 310/311
See application file for complete search history.

(56) References Cited

U.S. PATENT DOCUMENTS

| | | | |
|---|---|---|---|
| 2007/0216235 A1* | 9/2007 | Lee | 310/36 |
| 2010/0045612 A1* | 2/2010 | Molne | 345/173 |
| 2011/0032091 A1* | 2/2011 | Park et al. | 340/407.2 |
| 2011/0193824 A1* | 8/2011 | Modarres et al. | 345/177 |

* cited by examiner

*Primary Examiner* — Ariel Balaoing
(74) *Attorney, Agent, or Firm* — IPro, INc.; Na Xu

(57) ABSTRACT

A haptic feedback screen device include a case, a screen assembled in the case and having a baffling section extending perpendicular from a surface thereof, a piezoelectric vibrator located in the case with two ends thereof fixed to the case being capable of vibrating parallel to the screen. The piezoelectric vibrator defines a projecting element opposed to the baffling section of the screen for being capable of abutting against the baffling section.

6 Claims, 2 Drawing Sheets

HAPTIC FEEDBACK APPARATUS

FIELD OF THE INVENTION

The present invention generally relates to the art of haptic feedback systems, more particularly to a haptic feedback apparatus used in an electronic device having a screen.

RELATED ART OF THE INVENTION

Gradually, electronic devices, especially portable electronic devices, have been improved for providing better operating experience to a user. Generally, traditional electronic devices provide the user with visual or aural feedbacks, such as music playback and video playback. And in some devices, tactile feedbacks, well-known as "haptic feedbacks", are also provided to enhance the user's experience.

Haptic feedback is applied widely in electronic devices, such as mobile phones, notebook computers, and portable game-devices. For example, a joystick of a game device can provide the user with vibration feedback, or a portable computer can remind the user by alarm of vibration.

Active methods of providing tactile feedback include incorporating a vibrator into the handheld electronic devices. Such a method of providing haptic cues, however, generally vibrates the entire device, not the screen of the device. Such method or apparatuses are disclosed in U.S. Pat. No. 7,535,454 B2, U.S. Pat. No. 7,148,875 B2, U.S. Pat. No. 6,853,965 B2, U.S. Pat. No. 6,429,846 B2, and U.S. Pat. No. 6,405,158 B2.

Accordingly, it is necessary to provide a haptic feedback apparatus for a touch screen.

SUMMARY OF THE INVENTION

In one exemplary embodiment of the present invention, a haptic feedback screen device comprises a case, a screen assembled in the case and having a baffling section extending perpendicular from a surface thereof, a piezoelectric vibrator located in the case with two ends thereof fixed to the case and being capable of vibrating parallel to the screen. The piezoelectric vibrator defines a projecting element opposed to the baffling section of the screen for being capable of abutting against the baffling section.

Other features and advantages of the present invention will become more apparent to those skilled in the art upon examination of the following drawings and detailed description of the exemplary embodiment.

DETAILED DESCRIPTION OF THE PREFERRED EMBODIMENT

Reference will now be made to describe one embodiment of the present invention in detail.

A haptic feedback apparatus, in accordance with one exemplary embodiment of the present invention, is used to provide stronger feel to a user during operating an electronic device having a screen. Concretely, for example, the exploding effect in game can drive the screen of the game device to vibrate strongly, while a dripping can bring soft vibration. Or force feedback from the screen will be provided when the user presses a virtual button shown on the screen.

Figure 1:
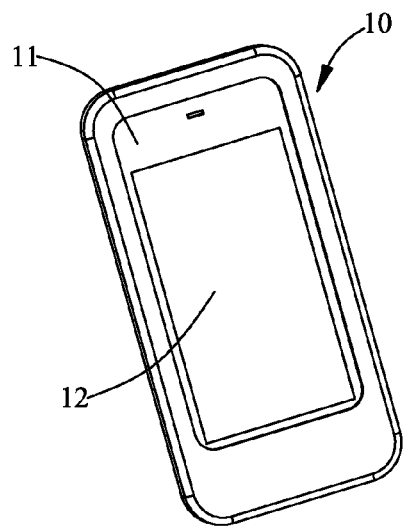
FIG. 1 depicts an isometric view of a haptic feedback apparatus in accordance with one exemplary embodiment of the present invention.

Referring to FIG. 1, the haptic feedback apparatus 10, in the exemplary embodiment of the present invention, includes a case 11, a screen 12 assembled in the case 11, and a piezoelectric vibrator 13. The haptic feedback apparatus described above may be construed as but not limited to a mobile phone.

Figure 2:
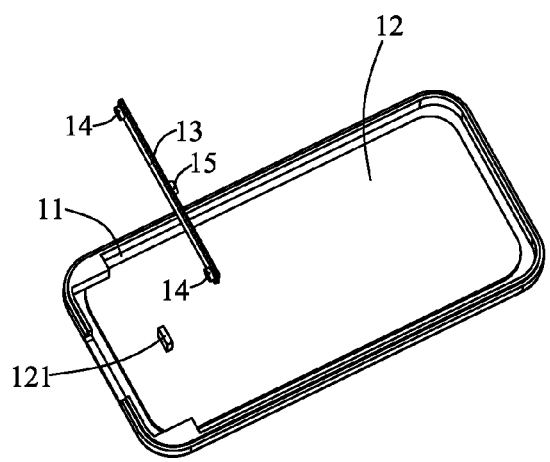
FIG. 2 is an isometric view of the haptic feedback device in FIG. 1, from another aspect, some parts thereof being disassembled.
Figure 3:
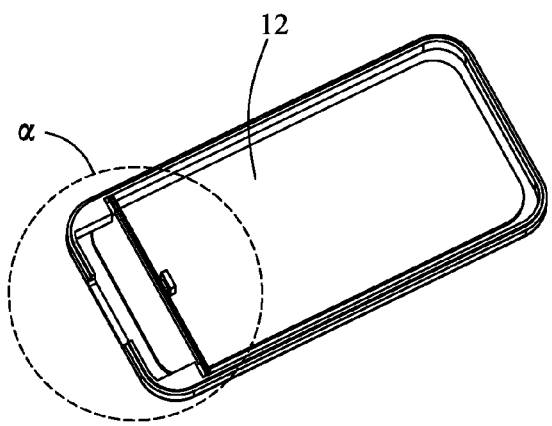
FIG. 3 is an assembled view of the haptic feedback apparatus in FIG. 2.

Referring to FIGS. 2-3, the screen 12 is fixed in the case 11, and the piezoelectric vibrator 13 is also positioned by the case 11.

A piezoelectric vibrator is a type of electric motor based upon the change in shape of a piezoelectric material when an electric field is applied. Piezoelectric vibrators make use of the converse piezoelectric effect whereby the material produces vibrations in order to produce a motion.

When the user operates the apparatus, electrical signals responding to the operation of the user, will be sent to a signal processor of the haptic feedback apparatus, and then the signal processor will provide the processed signals to the piezoelectric vibrator, by which, the piezoelectric vibrator will be activated to vibrate.

In the embodiment, vibrating direction of the piezoelectric vibrator 13 is parallel to the screen 12. How to control the vibrating direction of the piezoelectric vibrator is a known art to those skilled in the art and will not be described in detail.

The piezoelectric vibrator 13 defines two ends coupled to the case 11 and a projecting element 15 in a middle portion thereof. Correspondingly, the screen 12 defines a baffling section 121 extending perpendicularly from the screen 12 and opposed to the projecting element 15.

The piezoelectric vibrator 13 may be assembled with a peripheral portion of the screen for avoiding damaging the screen.

When electrified, the piezoelectric vibrator 13 vibrates toward the baffling section 121, and the projecting element 15 thereof bumps the baffling section 121, whereby the screen 12 is activated to vibrate to provide haptic feedback.

Figure 4:
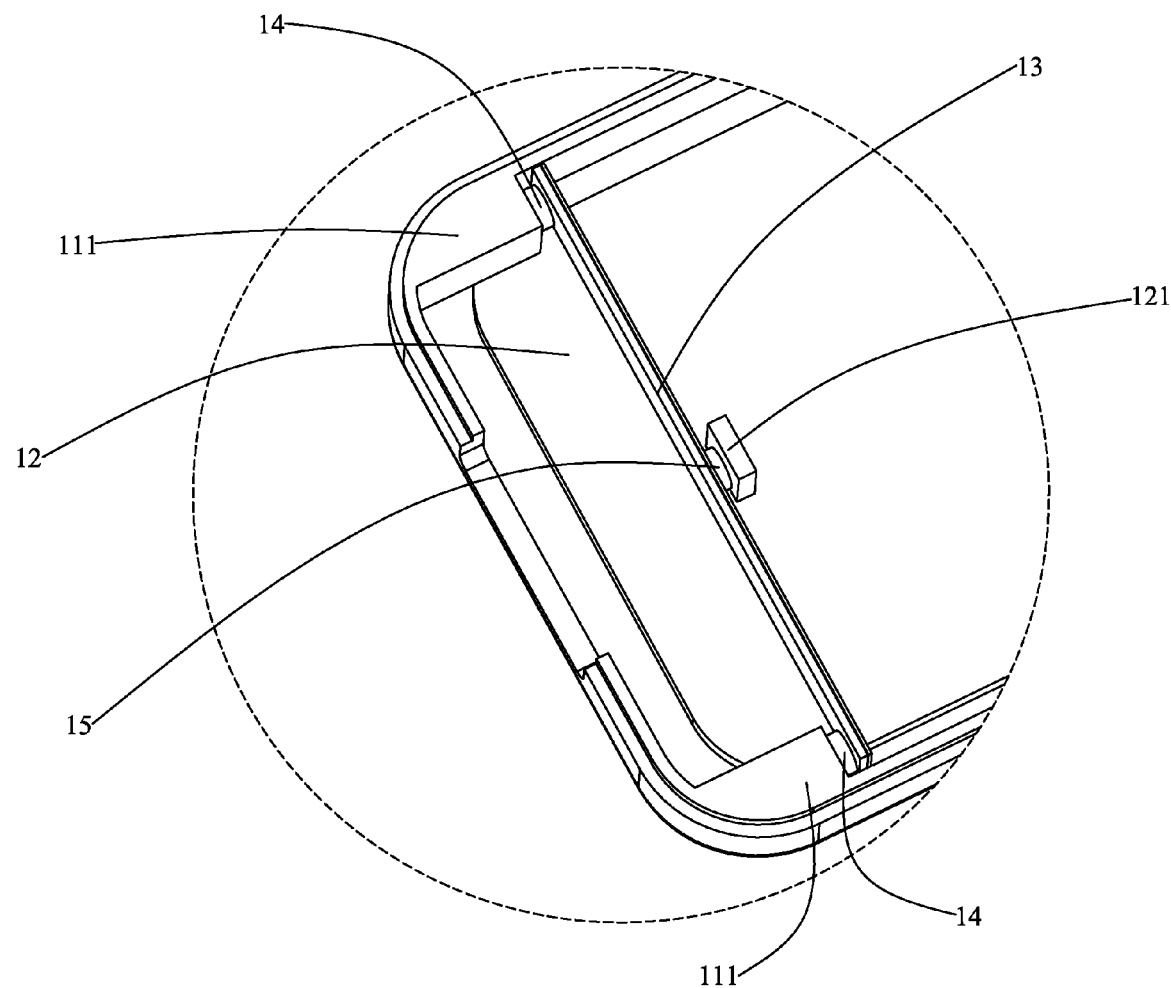
FIG. 4 is an enlarged view of the circled Area ■ in FIG. 3.

The piezoelectric vibrator 13 may be assembled with the case 11 with two ends thereof adhering to sidewalls of the case 11. Preferably, referring to FIGS. 2 and 4, the piezoelectric vibrator 13 defines a magnetic layer and a pair of magnets 14 attracted by and attached to the magnetic layer. The magnets 14 are fixed to the case 11, and accordingly the piezoelectric vibrator 13 is assembled with the case 11. The projecting element 15 may also be made of magnetic material for attracting to a center portion of the piezoelectric vibrator 13. In addition, in order to assemble the piezoelectric vibrator 13 with the case well, a pair of steps 111 is provided on the case 11 for mounting the magnets 14 thereon.

Actually, regarding the relationship between the projecting element 15 and the baffling section 121, when at initial state, i.e. non-vibrating state, the projecting element 15 may abut against the baffling section 121, or keep a distance from the baffling section 121 provided that the distance is shorter than the minimum displacement of vibration of the piezoelectric vibrator 13, i.e. the minimum amplitude of the vibrator. When the piezoelectric vibrator 13 vibrates, the haptic feedback from the screen is accordingly produced.

The manufacture of the piezoelectric vibrator is convenient and simple, and the form of the piezoelectric vibrator may be but not limited to a strip as shown in the exemplary embodiment. Therefore, it makes the screen vibrate uniformly, and the cost is lower.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A haptic feedback apparatus, comprising—
a case;
a screen assembled in the case and having a baffling section extending perpendicular from a surface thereof;
a piezoelectric vibrator located in the case with two ends thereof fixed to the case, the piezoelectric vibrator providing vibration parallel to the screen; wherein the piezoelectric vibrator defines a projecting element opposed to the baffling section of the screen for providing abutting against the baffling section.

2. The haptic feedback apparatus as described in claim 1, wherein the piezoelectric vibrator has a magnetic layer and two magnets attached to the magnetic layer.

3. The haptic feedback apparatus as described in claim 1, wherein the projecting element is made of magnetic material.

4. The haptic feedback apparatus as described in claim 1, wherein the baffling section abuts against the projecting element in an initial state.

5. The haptic feedback apparatus as described in claim 1, wherein the baffling section keeps a distance from the projecting element in an initial state, and, the distance is shorter than minimum vibrating amplitude of the piezoelectric vibrator.

6. The haptic feedback apparatus as described in claim 1, wherein the case defines a pair of steps therein for being assembled with two ends of the piezoelectric vibrator.

* * * * *